United States Patent Office 2,819,284
Patented Jan. 7, 1958

2,819,284
CERTAIN SUBSTITUTED CYCLIC AMIDINES

Kwan-Ting Shen, Brentwood, Mo., assignor to Petrolite Corporation, Wilmington, Del., a corporation of Delaware No Drawing. Application July 11, 1955
Serial No. 521,387

6 Claims. (Cl. 260—309.6)

The present invention is concerned with disubstituted polyamino cyclic amidines. Cyclic amidines include two types of materials, one of which has a five-membered ring and the other a six-membered ring. In both instances two nitrogen atoms are present. The structure of the ring is thus:

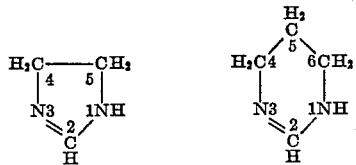

Cyclic amidines of the kind depicted above are obtained from diamines such as ethylene diamine or 1,3-propylene diamine. When cyclic amidines are obtained from polyamines having 3 or more nitrogen atoms such as diethylene triamine, triethylene tetramine, and tetraethylene pentamine, one obtains an amino derivative, for instance, an amino imidazoline under appropriate conditions of reaction. For instance, the amino imidazoline derived from the triamine, and tetramine or pentamine may be depicted thus:

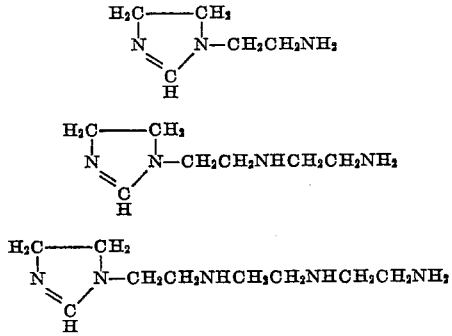

The corresponding tetrahydropyrimidines have substantially the same structure except for the difference noted previously.

As stated the present invention is concerned with disubstituted polyamino cyclic amidines. The expression "disubstituted polyamino" is used to indicate that instead of having a single radical having one or more nitrogen atoms present, one has two such radicals substituted in the ring which in both instances may have one or more nitrogen atoms present, or one has two ring-substituted radicals, one of which may have one or more nitrogen atoms present.

For purpose of convenience, reference will be made to disubstituted polyamino cyclic amidines with the qualification understood that at least one of the substituent radicals will have one or more nitrogen atoms present.

It will be noted, however, in order to point out the invention with specificity in the hereto appended claims, that the language employed is illustrated by the subject matter in the next two succeeding paragraphs.

The comparison of the structure can be shown by referring to a cyclic amidine (imidazoline) derived from a low molal acid and tetraethylene pentamine having the following structure:

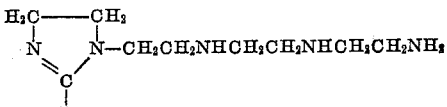

R=alkyl, aryl alicyclic radicals

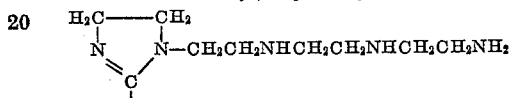

and a corresponding derivative of the present invention derived from acrylic acid. Note that in the second instance the product is a disubstituted polyaminocyclic amidine and, more specifically, a disubstituted imidazoline from the standpoint of the herein applied description.

Insofar that such products can be derived from a number of low molal unsaturated acids, as for example, acrylic, crotonic, etc., and from a variety of polyamines without reference whether the nitrogen atoms are separated by 2 carbon atoms or 3 carbon atoms or a mixture as, for example, the polyamine obtained by treating diethylene triamine with one mole of propylene imine, or inversely, the amine derived by treating one mole of dipropylene (1,3)propylene diamine with one mole of ethylene imine or by other means, or hydroxyalkylated polyamines it is desirable to describe the invention in terms of a generic formula which is as follows:

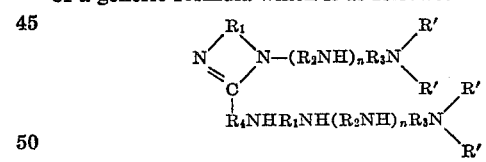

$R_1$, $R_2$ and $R_3$ are divalent hydrocarbon radicals containing at least 2 and not more than 3 carbon atoms in the straight chain; $R_4$ is the radical of an alpha-beta unsaturated acid having not over 18 carbon atoms and obtained by the elimination of the 2 carboxyl oxygen atoms; R' is selected from the class of hydrogen atoms and hydroxy alkyl radicals having not over 4 carbon atoms, and $n$ is an integer including zero, and

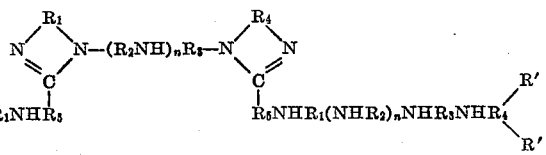

in which $R_4$ is a divalent radical, $R_5$ is derived from the alpha-beta unsaturated acid and the other symbols have their prior significance.

For purpose of convenience, what is said hereinafter is divided into five parts:

Part 1 is concerned with a more detailed discussion of the structures of the compounds herein described and the relationship to other cyclic amidines;

Part 2 is concerned with suitable reactants, such as unsaturated carboxy acids and polyamines which may be employed in the manufacture of the herein described disubstituted polyamino cyclic amidines;

Part 3 is concerned with the reactions involved and the products resulting from such reactions, i. e., the disubstituted polyamino imidazolines and diimidazolines;

Part 4 is concerned with uses for the products obtained in the manner described in Part 3, preceding; and Part 5 is concerned with derivatives which are obtainable by using the herein described disubstituted polyamino cyclic amidines as intermediates or reactants and for uses in which such ultimate products may be employed.

PART 1

As has been suggested previously the herein described compounds are a specific class of substituted cyclic amidines. When cyclic amidines are obtained from polyamines having 3 or more nitrogen atoms, they are frequently referred to as amino cyclic amidines, or amino imidazolines, or amino tetrahydropyrimidines. If one were to use the same general designation, the particular compounds herein would be referred to as disubstituted polyamino cyclic amidines in the sense that instead of one side chain containing amino groups there are two ring-substituted radicals one of which has at least one or more amino groups. For instance, the product derived from one mole of acrylic acid and two moles of diethylene triamine is indicated by the following formula:

$$CH_2\text{---}CH_2$$
$$N \diagup \diagdown N\text{---}CH_2CH_2NH_2$$
$$\diagdown C \diagup$$
$$\mid$$
$$CH_2CH_2NHCH_2CH_2NHCH_2CH_2NH_2$$

As is well known, acrylamide has the following structure:

$$CH_2\text{=}CH\overset{O}{\overset{\|}{C}}NH_2$$

If it were possible to form the amide from acrylic acid and diethylene triamine, the structure would be as follows:

$$CH_2\text{=}CH\text{---}C\overset{O}{\diagdown}NHCH_2CH_2NHCH_2CH_2NH_2$$

If such an amine could be heated so as to simply form the imidazoline, the structure would be as follows:

$$CH_2\text{=}CH\text{---}C\overset{N\text{---}CH_2}{\underset{N\text{---}CH_2}{\diagup}}$$
$$\mid$$
$$CH_2CH_2NH_2$$

Presumably such derivative of acrylic acid would be reactive in regard to the terminal vinyl radical and thus if heated with a second mole of diethylene triamine one would obtain a compound comparable to the one depicted above. Such procedure is unsatisfactory for any one of a number of reasons but it does illustrate the matter of structure. The reaction proceeds more likely by 1,4 addition of the polyamine to the alpha-beta unsaturated acid, followed by further amidification and cyclization as indicated.

$$CH_2\text{=}CHC\overset{O}{\diagdown OH} + H_2NCH_2CH_2NHCH_2CH_2NH_2 \longrightarrow CH_2\text{---}CH\text{=}C\overset{OH}{\diagdown OH} \rightleftarrows CH_2\text{---}CH_2\text{---}C\overset{O}{\diagdown OH} \xrightarrow[-H_2O]{H_2NCH_2CH_2NHCH_2CH_2NH_2}$$

(with side chains NH—CH₂—CH₂—NH—CH₂—CH₂—NH₂)

$$CH_2\text{---}CH_2\text{---}C\overset{O}{\diagdown NHCH_2CH_2NHCH_2CH_2NH_2} \xrightarrow{-H_2O} CH_2\text{---}CH_2\text{---}C\overset{N\text{---}CH_2}{\underset{N\text{---}CH_2}{\diagup}}$$

(with side chains NH—CH₂—CH₂—NH—CH₂—CH₂—NH₂ and CH₂CH₂NH₂)

If, instead of starting with diethylene triamine, one started with the dipropylene triamine which happened to be the 1,3 analogue, i. e., the trimethylene analogue, or more commonly known as 3,3'-iminobispropylamine, then instead of a 5-membered ring as depicted in the first formula, one would have a 6-membered ring in which the side chain nitrogens would be separated by three carbon atoms and not by two. The unsaturated acids which are particularly suitable for this purpose are acrylic, crotonic, methacrylic and other unhindred alpha-beta unsaturated acids.

Obvious equivalents, such as esters, acyl halides, or other amides could be employed instead of the acids themselves.

PART 2

Examples of suitable amines are the following which, for convenience, have been divided into groups according to certain generic structures.

1,2 polyamines

General formula:

$$\overset{R_1}{\underset{R_2}{\diagdown}}N\text{---}\left(\overset{R_5}{\underset{R_6}{\overset{\mid}{C}}}\text{---}\overset{R_7}{\underset{R_8}{\overset{\mid}{C}}}\text{---}\underset{H}{N}\right)_n\text{---}\overset{R_9}{\underset{R_{10}}{\overset{\mid}{C}}}\text{---}\overset{R_{11}}{\underset{R_{12}}{\overset{\mid}{C}}}\text{---}N\overset{R_3}{\underset{R_4}{\diagup}}$$

$R = H$, alkyl, etc.
3 of $R_1$ $R_2$ $R_3$ and $R_4$ must be H
$n = 1\text{-}3$ Examples:

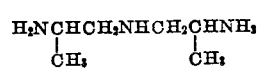
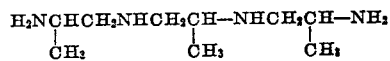
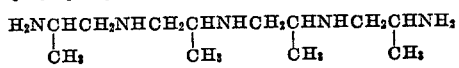

*1,3 polyamines*

General formula:

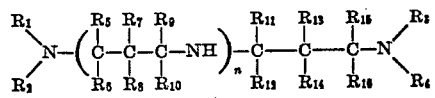

$R = H$, alkyl, etc.
3 of $R_1$ $R_2$ $R_3$ and $R_4$ must be H
$n = 1-3$

Examples:

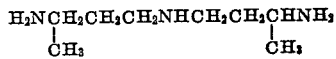
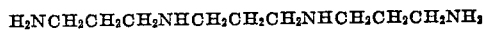

*Mixed polyamines*

General formula:

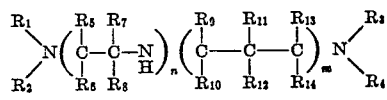

$R = H$, alkyl, etc.
$n, m$ = small whole numbers
3 of $R_1$ $R_2$ $R_3$ $R_4$ must be H Examples:

H$_2$NCH$_2$CH$_2$NHCH$_2$CH$_2$CH$_2$NH$_2$
H$_2$NCH$_2$CH$_2$NHCH$_2$CH$_2$NHCH$_2$CH$_2$CH$_2$NH$_2$
H$_2$NCH$_2$CH$_2$NHCH$_2$CH$_2$CH$_2$NHCH$_2$CH$_2$NH$_2$
H$_2$NCH$_2$CH$_2$CH$_2$NHCH$_2$CH$_2$NHCH$_2$CH$_2$NH$_2$

*Polyamino alcohols*

General formula:

(a)

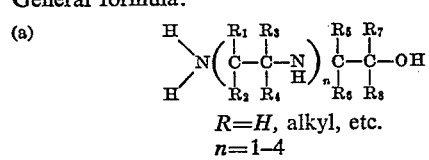

$R = H$, alkyl, etc.
$n = 1-4$

Examples:

H$_2$NCH$_2$CH$_2$NHCH$_2$CH$_2$OH
H$_2$NCH$_2$CH$_2$NHCH$_2$CH$_2$NHCH$_2$CH$_2$OH

General formula:

(b)

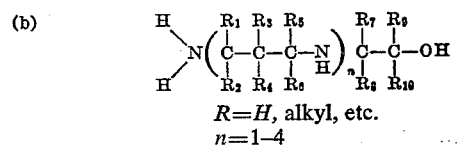

$R = H$, alkyl, etc.
$n = 1-4$

Examples:

H$_2$NCH$_2$CH$_2$CH$_2$NHCH$_2$CH$_2$OH$_2$
H$_2$NCH$_2$CH$_2$CH$_2$NHCH$_2$CH$_2$CH$_2$NHCH$_2$CH$_2$OH

General formula:

(c)

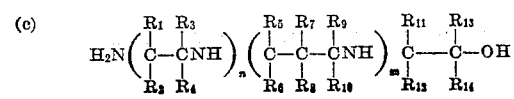

or

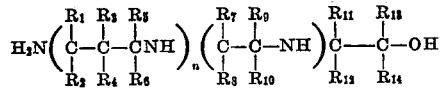

$R = H$, alkyl, etc.
$n, m$ = small whole number

Examples:

NH$_2$CH$_2$CH$_2$NHCH$_2$CH$_2$CH$_2$NHCH$_2$CH$_2$OH
NH$_2$CH$_2$CH$_2$CH$_2$NHCH$_2$CH$_2$NHCH$_2$CH$_2$OH

Typical acids which may be employed include the following:

CH$_2$=CHCOOH

Acrylic acid

CH$_3$CH=CHCOOH

Crotonic acid, isocrotonic acid

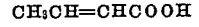

Methacrylic acid

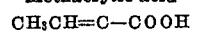

Agelic acid, tiglic acid

CH$_3$—C=C—C=C—COOH (with H substituents)

Sorbic acid

In the preparation of the herein described compounds the general procedure was as follows:

The 1.2-disubstituted polyamino monocyclic and di-cyclic amidines can be prepared by reacting a suitable poly-amine or acid halide in the ratio of from 3:2 to higher ratios. The use of large amine-to-acid ratio and lower temperatures tend to give higher yields of the respective 1.2-disubstituted polyamino monocyclic and di-cyclic amidines. Lower ratio and high reaction temperatures tend to give more polymerized material. The reaction mixture is heated around 200° C. until no more H$_2$O of reaction forms. The crude product is then fractionated under reduced pressure. The pure products are then identified by nitrogen analysis and infra-red absorption spectra.

A specific example is illustrated by the following:

*Example 1a*

8.6 g. (0.1 mole) of crotonic acid, 21.9 g. (0.15 mole) of triethylene tetramine and 10 g. of xylene were charged into a reaction flask furnished with a stirrer, a thermometer and a distillate collector. The mixture was heated until 3.3 ml. of water was collected. The maximum temperature was about 180° C. The crude product was transferred to a distilling flask and fractionated under reduced pressure (ca. 1 mm.). The following fractions were collected and identified by nitrogen analysis and infra-red absorption spectra.

| Fraction | Yield (g.) | Boiling Range, °C. | Percent N Found | Percent N Calculated |
|---|---|---|---|---|
| A | 7.7 | 134–140 | 33.25 | 32.75 |
| B | 3.4 | 145–148 | 31.65 | 31.24 |
| C | 3.4 | 154–164 | 30.20 | 30.21 |
| D | 5.6 | Up to 24 | 24.70 | |
| E | 10 | Residue | | |

The analyses of fractions A, B and C correspond to imidazolines of the following structures:

A.
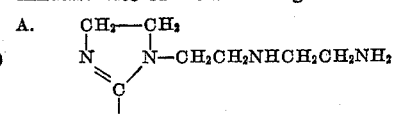

B. 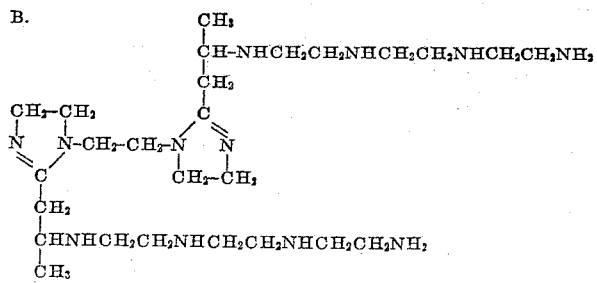

C. 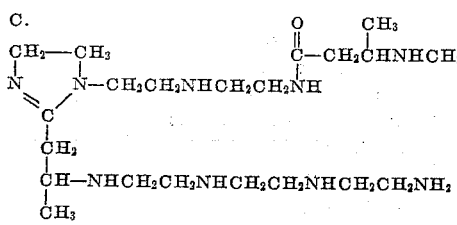

Fractions D and E were not identified, probably being mixtures of higher polymers of amides of crotonic acid.

As illustrating, in part, the variety of compounds which I have prepared exemplifying the present invention, reference is made to the following which, for convenience, are designated as Example 1b through and including Example 12b.

Particular attention is directed to the fact that in many instances the nitrogen content found was almost identical with the theoretical figure. Furthermore, in each instance such compounds have been subjected to infra-red examination and showed the characteristic cyclic C=N double bond absorption

*Example 1b*

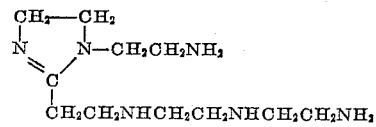

Percent nitrogen calculated, 34.71; found, 34.60.

*Example 2b*

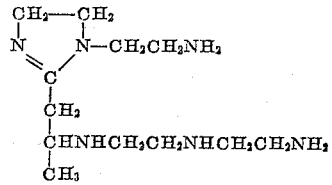

Percent nitrogen calculated, 32.81; found, 32.80.

*Example 3b*

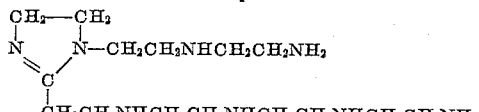

Percent nitrogen calculated, 34.14; found, 33.90.

*Example 4b*

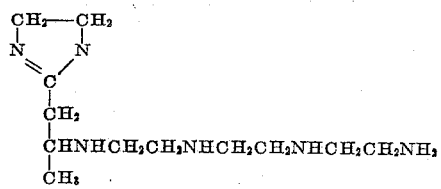

Percent nitrogen calculated, 32.75; found, 33.25.

*Example 5b*

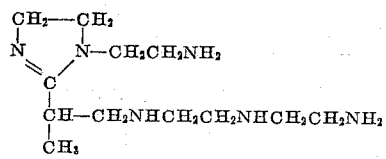

*Example 6b*

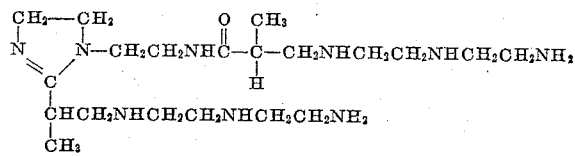

Percent nitrogen calculated, 28.17; found, 28.20.

*Example 7b*

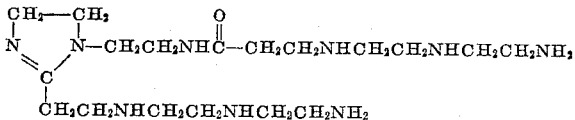

Percent nitrogen calculated, 31.60; found, 32.00.

*Example 8b*

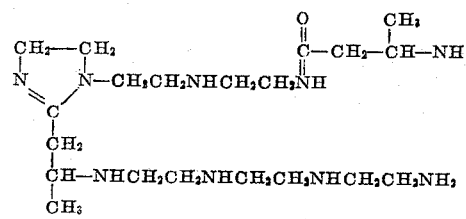

Percent nitrogen calculated, 30.21; found, 30.20.

*Example 9b*

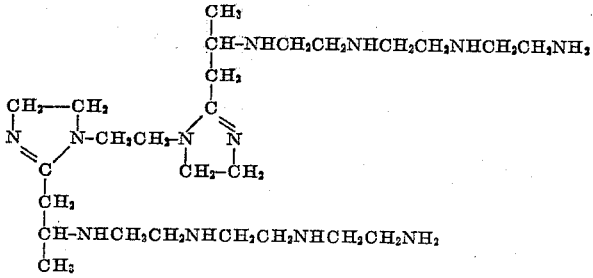

Percent nitrogen calculated, 31.65; found, 31.24.

Example 10b

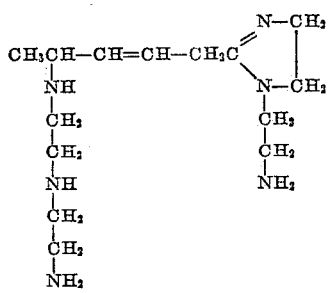

Percent nitrogen calculated, 30.00; found, 30.80.

(b)

$3NH_2CH_2CH_2NHCH_2CH_2NHCH_2CH_2NH_2 + 2CH_2=CHCOOH \xrightarrow{-4H_2O}$

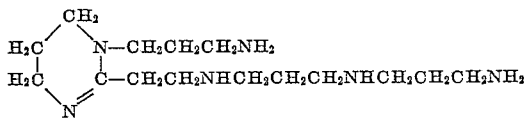

Example 11b

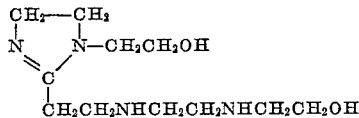

Percent nitrogen calculated, 28.15; found, 27.95.

Example 12b

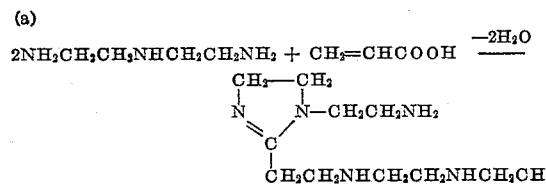

Percent nitrogen calculated, 18.85; found, 18.70.

PART 3

The reactions may be illustrated in the following way. Note the initial reaction does not give a disubstituted amine of the kind herein contemplated.

1.

$2NH_2CH_2CH_2NH_2 + CH_2=CHCOOH \xrightarrow{-2H_2O}$

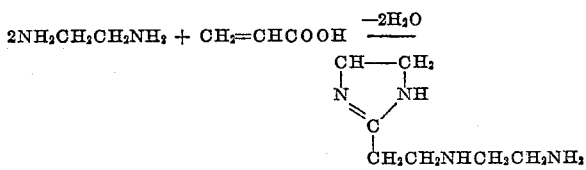

2.

(a)

$2NH_2CH_2CH_2NHCH_2CH_2NH_2 + CH_2=CHCOOH \xrightarrow{-2H_2O}$ (b)

$3NH_2CH_2CH_2NHCH_2CH_2NH_2 + 2CH_2=CHCOOH \xrightarrow{-3H_2O}$

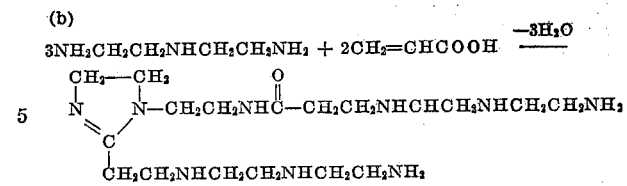

3.

(a)

$2NH_2CH_2CH_2NHCH_2CH_2NHCH_2CH_2NH_2 + CH_2=CHCOOH \xrightarrow{-2H_2O}$

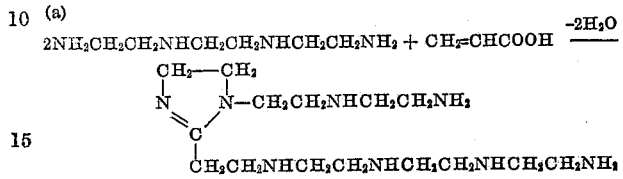

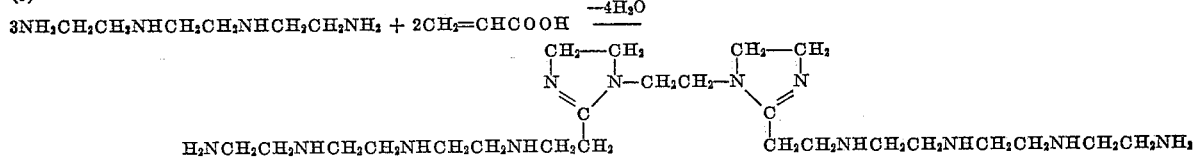

If one employs a polyamine in which the nitrogen atoms are separated by three carbon atoms, then the comparable compounds may be illustrated thus:

$NHRCH_2CH_2CH_2NH_2 + CH=CHCOOH \xrightarrow{-2H_2O}$ or in which R represents alkyl, alicyclic groups, etc.

Dicyclic amidines of the following general formula can be prepared as indicated in Example 1a, preceding. This may be as follows:

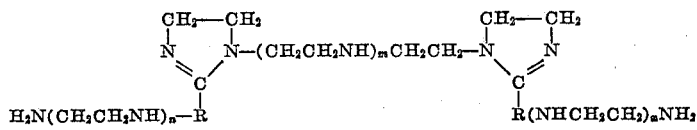

$n = 3$ to $5$
$m = 0$ to $2$
R is derived from the alpha-beta unsaturated acid by elimination of two oxygen atoms

PART 4

As to the method for using the herein described products for prevention of corrosion and particularly for preventing the corrosion of ferrous metals and more specifically in connection with the oil industry, reference is made to U. S. Patent No. Re. 23,227. See the subject matter beginning with line 49, column 8, and extending through line 69 in column 10. The same procedure has been employed herewith.

Note also that what is said in regard to the use of the materials as salts, whether organic or inorganic, applies with equal force and effect in the present instance and reference is made to the following two paragraphs which appear in column 8 of aforementioned Patent Re. 23,227, and apply with equal force and effect to the herein described compounds.

"Although we have described the corrosion inhibitors of our process as imidazolines, we may in many instances, employ these compounds in the form of their salts, either with organic or inorganic acids. Being relatively strong bases, the imidazolines readily form such salts, and where the reagent contains basic groups in addition to the imidazoline ring nitrogen atoms, they may form di- or poly-salts. Examples of acids which may be used to form such salts are hydrochloric acid, sulfuric acid, acetic acid, oxalic acid, maleic acid, oleic acid, abietic acid, phosphoric acid, petroleum sulphonic acid, naphthenic acid, rosin, phenylacetic acid, benzoic acid, and the like.

"Salts of the imidazolines, such as those above described, appear to be equally as effective as the free bases. Probably, in the dilute solutions in which they are employed as corrosion inhibitors, the salts hydrolyze or otherwise decompose to some extent and reach an equilibrium with the acids and other constituents of the corrosion medium."

Particularly suitable acids are low molal hydroxylated acids having not over six carbon atoms such as hydroxyacetic acid, lactic acid, gluconic acid, etc.

In the hereto appended claims reference to the cogeneric reaction products and the like is intended to include not only the products as such but also their salts derived from acids of the kind noted above. The basic materials may be partially or completely neutralized. Dicarboxy acids, and polycarboxy acids, such as diglycol acids, malonic acid, succinic acid, and the like may be employed.

PART 5

The products herein described have utility not only as such but also as initial reactants for further reaction. They may be combined with a variety of reactants as chemical intermediates, for instance, with various diepoxides or polyepoxides. They may be combined with a number of other monoepoxides, such as epichlorohydrin, styrene oxide, glycide and methylglycide. They may be reacted with alkyl glycidyl ether, glycidyl isopropylether, and glycidyl phenyl ether.

Furthermore, such products may be reacted with alkylene imines, such as ethylene imine or propylene imine, to produce cation-active materials. Instead of an imine one may employ what is a somewhat equivalent material, to wit, a dialkylaminoepoxypropane of the structure

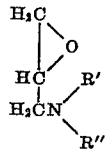

wherein R' and R" are alkyl groups.

The products may be combined with carboxy acids such as higher fatty acids, so as to change their characteristics or with polycarboxy acids, such as diglycolic, maleic acid, phthalic acid, succinic acid, and the like, to give resins, soft polymers or fractional esters which are essentially monomeric. Such products and others herein described, may all be used for the resolution of petroleum emulsions of the water-in-oil type. The products without further reaction are particularly valuable as additives for lubricating oils which are derived from sources other than petroleum.

Attention is directed to the fact that the compounds herein described may or may not have definite effective emulsifying properties. A quick test will reveal that a number of them produce emulsions by solution in xylene followed by shaking with water as previously described. Over and above this, one sub-specie of the emulsifying species, are those which dissolve in xylene and produce an emulsion but are additionally characterized by the fact that they do not dissolve in water but hydrate in water to give a water-insoluble precipitate generally having the appearance of a floc or flocculent curd or curd which obviously is hydrated and usually highly hydrated. This particular specie or sub-specie, not only has utility for the purposes mentioned in regard to the class of materials as a whole but also has additional uses. Particular reference is made to five such uses for such more narrow class.

In the first place the material is valuable as a fuel oil additive in the manner described in U. S. Patent No. 2,553,183, dated May 15, 1951, to Caron et al. It can be used in substantially the same proportions or lower proportions and this is particularly true when used in conjunction with a glyoxalidine or amido glyoxalidine.

An analogous use in which these products are equally satisfactory, is that described in U. S. Patent No. 2,665,978, dated January 12, 1954, to Stayner et al. The amount employed is in the same proportion or lesser amounts than referred to in said aforementioned Caron et al. patent.

The second use is for the purpose of inhibiting fogs in hydrocarbon products as described in U. S. Patents No. 2,550,981 and 2,550,982, both dated May 1, 1951, and both to Eberz. Here again it can be used in the same proportions as herein indicated or even small proportions.

A third use is to replace oil soluble petroleum sulfonates, so-called mahogany soaps, in the preparation of certain emulsions, or soluble oils or emulsifiable lubricants where such mahogany soaps are employed. The cogeneric mixtures having this peculiar property serve to replace all or a substantial part of the mahogany soap.

Another use is where the product does not serve as an emulsifying agent alone but serves as an adjunct.

Briefly stated, the fourth use is concerned with use as a coupling agent to be employed with an emulsifying agent. See "The composition and structure of technical emulsions," J. H. Goodey, Roy. Australian Chem. Inst. J. & Proc., vol. 16, 1949, pp. 47–75. As stated, in the summary of this article, it states "The technical oil-in-water emulsion is regarded as a system of four components: the dispersion medium, consisting of the highly polar substance water; the disperse phase composed of hydrocarbons or other substances of comparatively weak polarity; the coupling agent, being an oil-soluble substances involving an hydroxyl, carboxyl or similar polar group; and the emulsifying agent, which is a water-soluble substance involving an hydrocarbon radical attached to an ionizable group."

Thus, these peculiar products giving curd precipitates with water, are unusually effective as coupling agents in many instances.

Fifth, these materials have particular utility in increasing the yield of an oil well by various procedures which in essence involve the use of fracturing of the strata by means of liquid pressure. A mixture of these products with oil or oil in combination with a gel former alone or a gel former and finely divided mineral particles, yields a product which, when it reaches crevices in the strata which are yielding water, forms a gelatinous mass of curdy precipitate or solid or semi-solid emulsion of a high viscosity. In any event, it represents a rapid sealing agent for the strata crevices and permits pressure to be applied to fracture the strata without loss of fluid through crevices, openings or the like.

The addition of the oxyalkylene chain, and particularly the oxypropylene chain, to polyols produces effects at times impossible to predict and even difficult to evaluate after being recognized. For instance, the reaction of monooxyethylated aminopropyl diethyleneglycol with propylene oxide to yield a hydroxylated material which can be reacted with polycarboxy acids, particularly dicarboxy acids, to give fractional esters or polymers is well known. Such products are excellent demulsifying agents. Certain polyols particularly having 3 or more hydroxyl, as for example glucose, when reacted with 33 to 50 parts by weight of propylene oxide yield derivatives which without any further reaction of any kind are effective demulsifying agents. Such derivatives are also effective for other purposes, such as an anti-fogging agent in motor fuels, a coagulation preventive in burner oils, and as an additive for the prevention of corrosion of ferrous metals. Such invention, however, is not part of what is herein claimed.

The herein described products and the derivatives thereof are particularly valuable in flooding processes for recovery of oil from subterranean oil-bearing strata when employed in the manner described in U. S. Patent No. 2,233,381, dated February 25, 1941, to De Groote and Keiser.

Furthermore, the herein described products may be employed to increase operating efficiency by increasing the oil-to-brine ratio or by increasing the total oil recovery in primary recovery operations as differentiated from secondary recovery operations. The procedures employed are essentially those as described in either U. S. Patent No. 2,331,594, dated October 12, 1943, to Blair, or U. S. Patent No. 2,465,237, dated March 22, 1949, to Larsen.

When the products of the kind herein described are used for water flooding and particularly in the form of salts, they have unusual value in a fresh water or brine system for the inhibition of the growth of both anaerobic and aerobic bacteria but are particularly applicable in controlling the sulfate reducing organisms which cause difficulty in secondary recovery operations. Thus, one may use some other agent or agents in water flood systems and use compounds as herein described primarily for reducing bacterial growth. The use of such industrial bactericide is well known and the procedure is conventional; for instance, one can use the methods described in an article entitled "The role of microorganisms," by R. C. Allred, which appeared in Producers Monthly, volume 18, No. 4, pages 18–22.

Attention again is directed to the fact that the cogeneric mixtures herein described contain a significant or substantial amount of cyclic amidines or cyclic amidine derivatives. There is no intention of differentiating between the unneutralized product, the hydrate formed on combination with water, and the salts. As far as we have been able to determine in every instance the amount of cyclic amidine compounds or derivatives present represent approximately one-third or more, probably one-half or more, of the total cogeneric mass. In many instances probably two-thirds, or almost the entire cogeneric mass, is characterized by the cyclic amidine structure.

In the use of the herein described products as industrial bactericides and particularly in connection with water flood operations I prefer to use the salts obtained by partial or total neutralization with carboxy acids, particularly monocarboxy acids having not over 6 carbon atoms and preferably a hydroxylated acid such as hydroxyacetic acid.

Specific attention is directed to the article entitled "Preparation of water for injection into water reservoirs," which appeared in the Journal of Petroleum Technology, volume 7, No. 4, page 9 (April 1955). The author is Torrey.

A somewhat analogous class of disubstituted cyclic amidines has been illustrated in which one substituent does not necessarily have a nitrogen atom. This is an instance of the kind in which hydroxyethyl ethylene diamine, hydroxypropyl ethylene diamine, hydroxybutyl ethylene diamine, hydroxyethyl 1,3-propylene diamine, hydroxypropyl 1,3-propylene diamine, hydroxybutyl 1,3-propylene diamine, or the like, are used to give a type of compound previously illustrated, to wit,

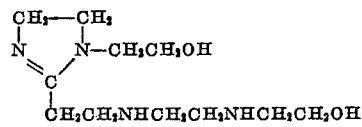

This type of compound can be used for all the various purposes herein described but is considered a separate invention for the reason that it apparently cannot be consolidated and included in the claims of the type herein employed.

Furthermore, the precursory diamines of the kind referred to above can be reacted with other alkylene oxides such as glycide, methyl glycide, allyl glycidyl ether, glycidyl isopropyl ether, glycidyl phenyl ether, styrene oxide, etc., on a mole-for-mole basis. The resultant of such reaction can be used in the same manner as the substituted diamines above noted.

It is well known that cyclic amidines can be prepared from dicarboxy acids. In such instances where the dicarboxy acids include an activated double bond, compounds can be obtained which are similar to those herein described. Stated another way, one can react maleic acid, fumaric acid, itaconic acid, citraconic acid, aconitic acid, etc., with polyamines of the kind herein described to form cyclic amidines with amino groups in the side chain. Thus, these products are another genus of a cyclic amidine. Typical examples are illustrated by the following structures:

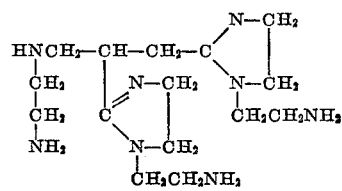

The preceding compound is derived from itaconic acid and diethylenetriamine whereas the compound below is obtained similarly by the use of maleic acid instead of itaconic acid.

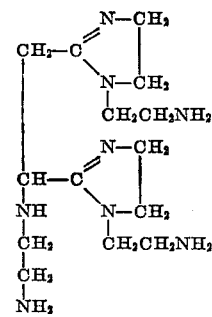

This particular variety, although not part of the present invention, can be used for the same purpose as the particular cyclic amidines herein described.

Having thus described my invention, what I claim as new and desire to secure by Letters Patent, is:

1. Disubstituted cyclic amidines of the class of tetrahydropyrimidines and aminoimidazolines of the structure

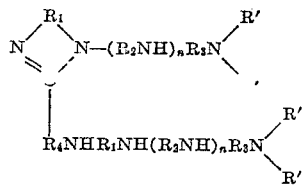

$R_1$, $R_2$, and $R_3$ are divalent saturated hydrocarbon radicals containing at least 2 and not more than 3 carbon atoms in the straight chain; $R_4$ is the saturated carboxyl-free residue of an alpha-beta unsaturated, lower alkylene acid; R' is a member selected from the class consisting of hydrogen atoms and hydroxy alkyl radicals having not over 4 carbon atoms, and $n$ is a small whole number including zero; and

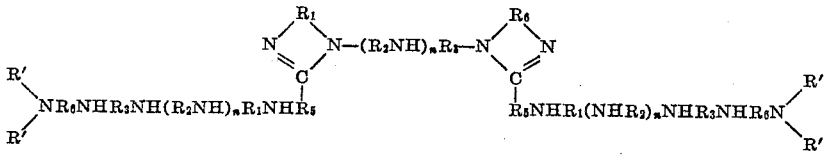

in which $R_6$ is a divalent saturated hydrocarbon radical, $R_5$ is the saturated carboxyl-free residue of an alpha-beta unsaturated, lower alkylene acid, and the other symbols have their prior significance.

2. The imidazolines of claim 1 in which $R_1$, $R_2$ and $R_3$ are divalent ethylene radicals, the unsaturated acid is acrylic acid, R' is hydrogen in all occurrences and $n$ is 1.

3. The imidazolines of claim 1 in which $R_1$, $R_2$ and $R_3$ are divalent ethylene radicals, the unsaturated acid is crotonic acid, R' is hydrogen in all occurrences and $n$ is 1.

4. The imidazolines of claim 1 in which $R_1$, $R_2$ and $R_3$ are divalent ethylene radicals, the unsaturated acid is methacrylic acid, R' is hydrogen in all occurrences and $n$ is 1.

5. The imidazolines of claim 1 in which $R_1$, $R_2$ and $R_3$ are divalent ethylene radicals, the unsaturated acid is tiglic acid, R' is hydrogen in all occurrences and $n$ is 1.

6. The imidazolines of claim 1 in which $R_1$, $R_2$ and $R_3$ are divalent ethylene radicals, the unsaturated acid is sorbic acid, R' is hydrogen in all occurrences and $n$ is 1.

No references cited.